United States Patent
Kao et al.

(10) Patent No.: US 6,630,918 B2
(45) Date of Patent: Oct. 7, 2003

(54) COMPENSATION METHOD FOR IMPROVING COLOR PURITY AND COLOR TEMPERATURE OF PLASMA DISPLAY PANEL BY ADJUSTING THE STRENGTH OF INPUT IMAGE SIGNALS

(75) Inventors: Shiuh-Bin Kao, Taipei (TW); Yao-Hung Lai, Taipei (TW); Kuang-Lang Chen, Taipei (TW); Ching-Hui Lin, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 146 days.

(21) Appl. No.: 09/859,401

(22) Filed: May 18, 2001

(65) Prior Publication Data

US 2002/0140638 A1 Oct. 3, 2002

(30) Foreign Application Priority Data

Apr. 3, 2001 (TW) ........................... 90108032 A

(51) Int. Cl.$^7$ ................ G09G 3/28; G09G 3/30; G09G 5/02
(52) U.S. Cl. ................ 345/63; 345/77; 345/690
(58) Field of Search ............... 345/37, 63, 77, 345/589, 690; 315/169.4; 348/797

(56) References Cited

U.S. PATENT DOCUMENTS

| | | | |
|---|---|---|---|
| 6,094,185 A | * | 7/2000 | Shirriff .................. 345/102 |
| 6,204,833 B1 | * | 3/2001 | Hayashi et al. .............. 345/58 |
| 6,229,582 B1 | * | 5/2001 | Van Slooten ................ 349/32 |
| 6,271,825 B1 | * | 8/2001 | Greene et al. .............. 345/694 |
| 6,304,254 B1 | * | 10/2001 | Johnson et al. ............. 345/204 |
| 6,411,306 B1 | * | 6/2002 | Miller et al. ................ 345/690 |
| 6,414,660 B1 | * | 7/2002 | Kasahara et al. ............. 345/63 |
| 6,489,965 B1 | * | 12/2002 | Voorhies ................... 345/589 |

* cited by examiner

Primary Examiner—Richard Hjerpe
Assistant Examiner—M. Fatahiyar
(74) Attorney, Agent, or Firm—Bacon & Thomas, PLLC

(57) ABSTRACT

A compensation process for improving color saturation and image quality of a plasma display panel (PDP) is provided, wherein a brightness of light generated from each of red, green, and blue discharge cells of each pixel on said PDP is calculated through a numeric operation according to laws of color matching. The process comprises the step of increasing or decreasing the strength of input image signals of each of the red, green, and blue discharge cells in accordance with the calculation result for adjusting brightness of the generated red, green, and blue lights so as to subtract a visible light generated by gas in each of the red, green, and blue discharge cells during gas discharging, thereby eliminating an adverse effect of the visible light on color purity and color temperature of the PDP during gas discharging. This can obtain an image on PDP having an optimum color purity and color temperature and reduce the manufacturing cost.

20 Claims, 4 Drawing Sheets

COMPENSATION METHOD FOR IMPROVING COLOR PURITY AND COLOR TEMPERATURE OF PLASMA DISPLAY PANEL BY ADJUSTING THE STRENGTH OF INPUT IMAGE SIGNALS

FIELD OF THE INVENTION

The present invention relates to plasma display panels and more particularly to a compensation method for improving color purity and color temperature of plasma display panel by adjusting the strength of input image signals.

BACKGROUND OF THE INVENTION

A manufacturing process of a conventional alternating current discharge type plasma display panel (PDP) 10 is shown in FIG. 1. First, two different activation layers are formed on glass substrates 11 and 12 respectively. Then seal the peripheries of the glass substrates together. A mixed gas consisting of helium (He), neon (Ne), and xenon (Xe) (or argon (Ar)) having a predetermined mixing volume ratio is stored in a discharge space formed in between the glass substrates. A front plate 11 is defined as one that facing viewers. A plurality of parallel spaced transparent electrodes 111, a plurality of parallel spaced bus electrodes 112, a dielectric layer 113, and a protective layer 114 are formed from the front plate 11 inwardly. From a corresponding rear plate 12 inwardly, a plurality of parallel spaced data electrodes 121, a dielectric layer 124, a plurality of parallel spaced ribs 122, and a uniform phosphor layer 123 are formed. When a voltage is applied on electrodes 111, 112, and 121, dielectric layers 113 and 124 will discharge in discharge cell 13 formed by adjacent spaced ribs 122. As a result, a ray having a desired color is emitted from phosphor layer 123.

Conventionally, in PDP 10 a plurality of parallel spaced transparent electrodes 111 are formed on inner surface of front plate 11 by sputtering and photolithography (or printing). Then a plurality of parallel spaced bus electrodes 112 are formed on the transparent electrodes 111 respectively by plating (or sputtering) and photolithography. The line impedance of the transparent electrodes 111 may be reduced by the provision of bus electrodes 112. In the following description, two adjacent transparent electrodes 111 (including bus electrodes 112) on the front plate 11 are represented by X electrode and Y electrode respectively. A triple electrode is formed by X electrode, Y electrode and corresponding data electrode 121 on the rear plate 12. When a voltage is applied on the triple electrode, dielectric layers 113 and 124 will discharge in discharge cell 13 formed by adjacent spaced ribs 122. Hence, UV rays are emitted from the mixed gas stored therein. And in turn, phosphor layer 123 in discharge cell 13 is activated by the UV rays. As an end, a visible light is generated by red, green and blue phosphor layers, resulting in an image showing.

In the conventional PDP 10, a mixed gas (which is a combination of neon (Ne) and xenon (Xe), a combination of helium (He), neon (Ne) and xenon (Xe), a combination of neon (Ne), xenon (Xe), and argon (Ar), or a combination of helium (He), neon (Ne), xenon (Xe) and argon (Ar)) is used. Note that neon (Ne) is the indispensable constituent component of any of the above combinations. When a discharge is occurred in any of the above combinations, an orange red of visible light $O_g$ having a wavelength of about 586 nm is generated as shown in FIGS. 2a and 2b. Note that the color of the visible light emitted during discharging may be one other than orange red if the combination of the mixed gas is changed. Such orange red of visible light generated by the gas in each of red, green, and blue discharge cells inevitably and adversely affects the color purity of PDP 10 and results in a lowering of color temperature of PDP 10.

Conventionally, as to the poor color purity and low color temperature of PDP caused by orange red of visible light during gas (mainly by Ne) discharging in discharge cell 13, a number of improvements have been proposed by PDP manufacturers to mitigate the above problems. For example, NEC (Japan) implements a capsulated color filter technique. A filter 20 on front plate 11 is formed on each of corresponding red, green, and blue discharge cells 13 as shown in FIG. 3. With this, it is possible to filter out the orange red of visible light $O_g$ from discharge cells 13, thereby increasing color purity and color temperature of PDP. However, the manufacturing cost is increased significantly because the manufacturing process of filters 20 is complex and the precision requirement is much higher. Another improvement technique is proposed by Matsushita (Japan) in which the sizes of red, green, and blue discharge cells 13 are made different one another as shown in FIG. 4. The size of blue discharge cell 13 is the largest among all discharge cells 13 for increasing color temperature of PDP. Also, the size of red discharge cell 13 is the smallest among all for decreasing the affecting degree on the color temperature of PDP. However, the manufacturing process is complex. Further, there is a great difficulty in driving such device.

In view of the above, such conventional improvements are disadvantageous for the complex process and undesirable design of PDP since the construction of PDP is changed for eliminating the adverse effect of the generated orange red of visible light on the color purity and color temperature of PDP. Thus, it is desirable to provide a novel method for improving color purity and color temperature of PDP in order to overcome the above drawbacks of prior art.

SUMMARY OF THE INVENTION

It is an object of the present invention to provide a compensation process for improving color saturation and image quality of a plasma display panel (PDP), wherein a brightness of light generated from each of red, green, and blue discharge cells of each pixel on said PDP is calculated through a numeric operation according to laws of color matching, the process comprising the step of increasing or decreasing the strength of input image signals of each of the red, green, and blue discharge cells in accordance with the calculation result for adjusting the brightness of the generated red, green, and blue lights so as to subtract a visible light generated by the gas in each of the red, green, and blue discharge cells during gas discharging, thereby eliminating an adverse effect of the visible light on color purity and color temperature of the PDP during gas discharging.

The above and other objects, features and advantages of the present invention will become apparent from the following detailed description taken with the accompanying drawings.

DETAILED DESCRIPTION OF THE PREFERRED EMBODIMENTS

Figure 1:
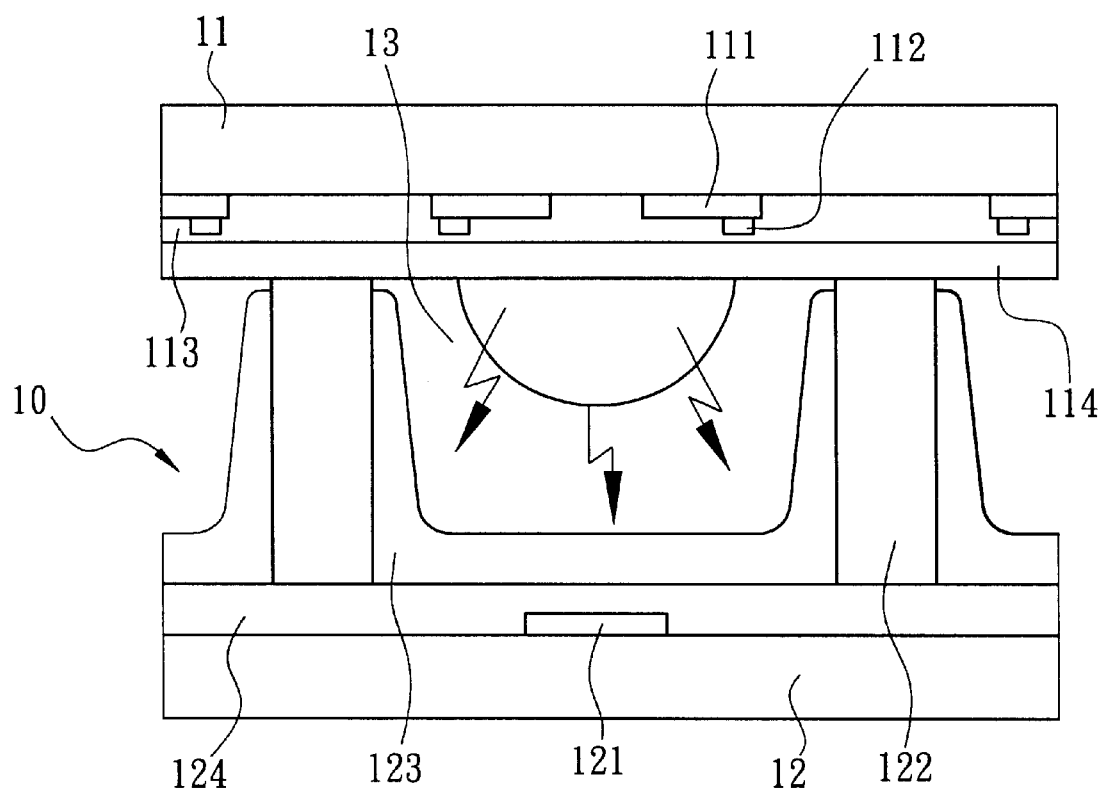
FIG. 1 is a sectional view of a conventional alternating current discharge type plasma display panel (PDP)
Figure 2A:
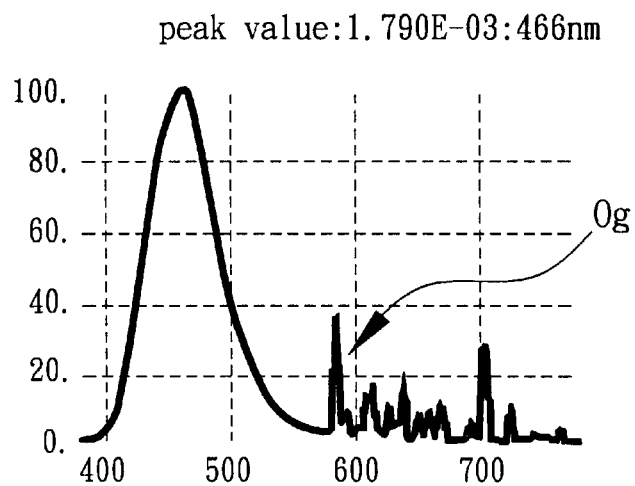
FIG. 2a and FIG. 2b are spectrum graphs measured from a pixel on a conventional alternating current discharge type plasma display panel (PDP) with different brightness.
Figure 2B:
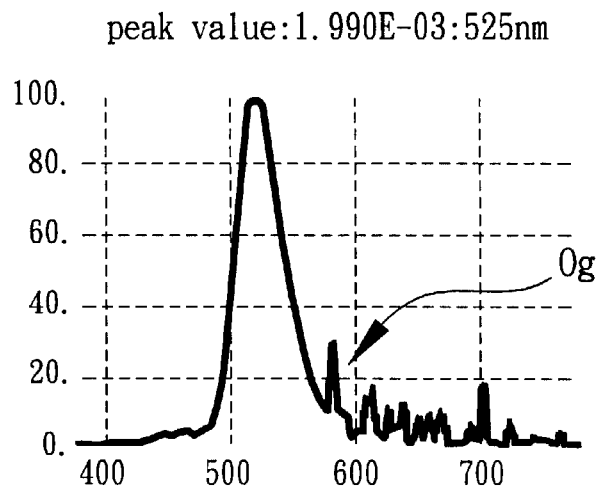
Figure 3:
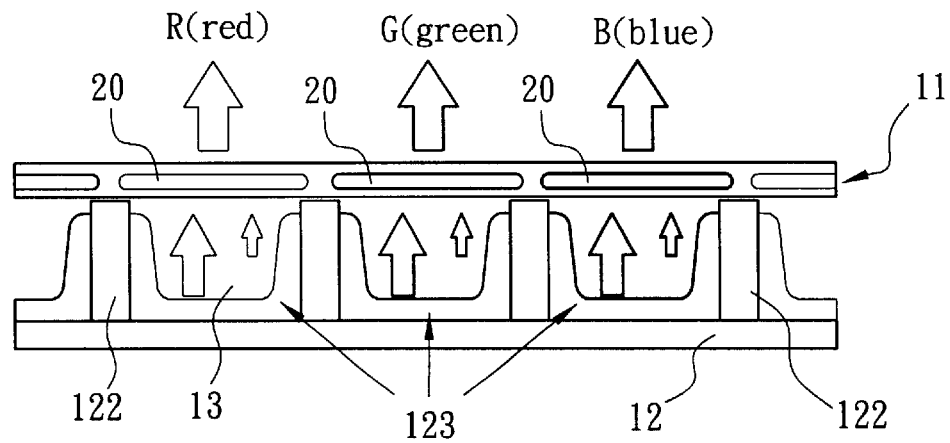
FIG. 3 is a sectional view of another conventional technique utilized by NEC (Japan) illustrating the implementation of capsulated color filters.
Figure 4:
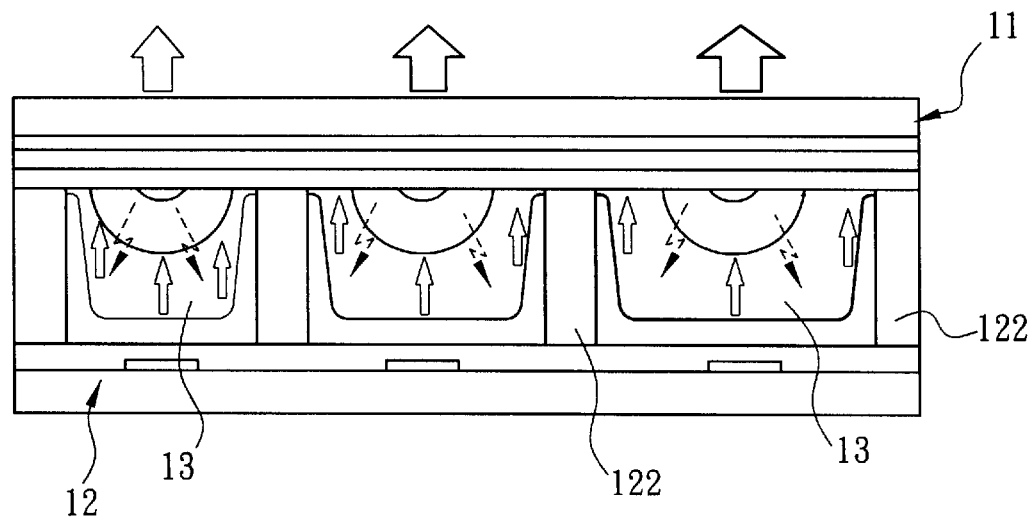
FIG. 4 is a sectional view of still another conventional technique utilized by Matsushita (Japan) illustrating the implementation of different sizes of red, green, and blue discharge cells.

Typically, an image shown on a well known PDP consists of a plurality of pixels. Note that the number of pixels is determined by the resolution of PDP. A pixel consists of three discharge cells capable of emitting red, green, and blue lights respectively. Hence, the color of a pixel of image shown on PDP is a mixture of red, green and blue lights emitted by respective discharge cell. For example, a, b, and c are gray scales of red, green and blue lights emitted by respective discharge cell of each pixel of PDP. Also, $R_p$, $G_p$, and $B_p$ are brightness generated by unit gray scale of phosphor layer in red, green and blue discharge cells of each pixel of PDP. Further, $O_g$ is brightness of orange red of visible light generated by unit gray scale during gas discharging. Hence, the brightness of red, green, and blue discharge cells and pixel may be expressed by equations (1), (2), (3) and (4) below:

$$\text{brightness of red discharge cell} = aR_p + aO_g \quad (1),$$

$$\text{brightness of green discharge cell} = bG_p + bO_g \quad (2),$$

$$\text{brightness of blue discharge cell} = cB_p + cO_g \quad (3) \text{ and}$$

$$\text{brightness of pixel} = \text{brightness of red discharge cell} + \text{brightness of green discharge cell} + \text{brightness of blue discharge cell} = aR_p + bG_p + cB_p + (a+b+c)O_g, \quad (4)$$

where (a+b+c) $O_g$ is the adverse effect of thus generated orange red of visible light on PDP, i.e., the main factor for causing poor color purity and low color temperature of PDP.

Figure 5:
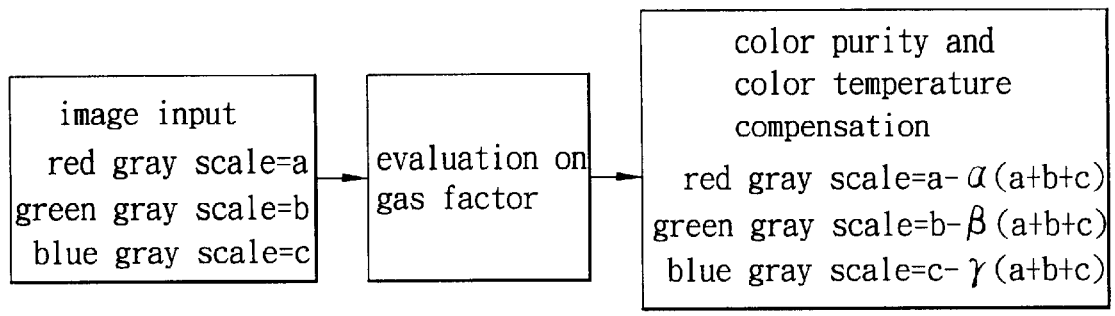
FIG. 5 is a block diagram of a preferred embodiment of compensation process according to the invention.
Figure 6:
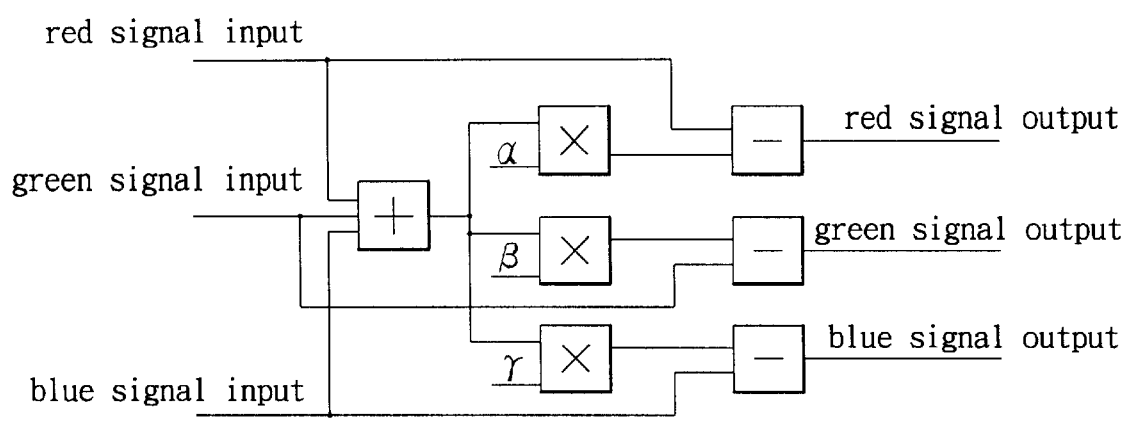
FIG. 6 is a schematic diagram showing the circuitry implemented to increase or decrease the strength of input image signals of each of the red, green, and blue discharge cells for adjusting the brightness of the generated red, green, and blue lights.

One aspect of the invention is to eliminate the adverse effect of such orange red of visible light on color purity and color temperature of PDP. Thus, laws of color matching proposed by Grassman is adopted in which the brightness of color generated by each of red, green and blue discharge cells may be calculated through a numeric operation as shown in FIG. 5. Further, with the implementation of circuitry shown in FIG. 6, the invention can increase or decrease the strength of input image signals (or input voltage) of each discharge cell and adjust the brightness of thus generated red, green or blue lights. Hence, the adverse effect of such orange red of visible light on color purity and color temperature of PDP may be eliminated. As a result, an image having an optimum color purity and color temperature is rendered, resulting in an elimination of the adverse effect of such orange red of visible light on color purity and color temperature of PDP experienced in prior art.

In a first embodiment of the invention, orange red of visible light on PDP generated by gas discharging may be prepared by a predetermined mixing ratio of red, green and blue lights. For eliminating the orange red of visible light which has an adverse effect on PDP, it is possible to subtract thus additionally generated orange red of visible light from the light generated by red, green and blue discharge cells through a numeric operation. Also, the value of the subtracted orange red of visible light is calculated. As stated above, $O_g$ is brightness of orange red of visible light generated during gas discharging and may be expressed by $R_p$, $G_p$ and $B_p$, i.e., $O_g = \alpha R_p + \beta G_p + \gamma B_p$ where $\alpha, \beta$ and $\gamma$ are constants or variables. In compensation, the invention may subtract the term of $\alpha(a+b+c)R_p$ (i.e., brightness of light) from red discharge cell, subtract the term of $\beta(a+b+c)G_p$ from green discharge cell, and subtract the term of $\gamma(a+b+c)B_p$ from blue discharge cell respectively. Hence, the adverse effect of orange red of visible light on color purity and color temperature of PDP is eliminated, in which $\alpha(a+b+c)R_p$, $\beta(a+b+c)G_p$, and $\gamma(a+b+c)B_p$ are compensation functions.

Hence, after the compensation on image of PDP by the invention, the brightness of red discharge cell, green discharge cell, blue discharge cell, and pixel may be expressed by equations (5), (6), (7) and (8) below:

$$\text{brightness of red discharge cell} = aR_p + aO_g - \alpha(a+b+c)R_p \quad (5)$$

$$\text{brightness of green discharge cell} = bG_p + bO_g - \beta(a+b+c)G_p \quad (6)$$

$$\text{brightness of blue discharge cell} = cB_p + cO_g - \gamma(a+b+c)B_p \quad (7), \text{ and}$$

$$\text{brightness of pixel} = \text{brightness of red discharge cell} + \text{brightness of green discharge cell} + \text{brightness of blue discharge cell} = aR_p + bG_p + cB_p + (a+b+c)O_g - \alpha(a+b+c)R_p - \beta(a+b+c)G_p - \gamma(a+b+c)B_p = aR_p + bG_p + cB_p \quad (8)$$

Since brightness of orange red of visible light $O_g$ generated during gas discharging may be expressed by $R_p$, $G_p$ and $B_p$, i.e. $O_g = \alpha R_p + \beta G_p + \gamma B_p$, thus it is apparent from equation (8) that the orange red of visible light $O_g$ component of brightness of pixel is subtracted after compensation. Thus, the adverse effect of orange red of visible light on PDP is eliminated.

In a second embodiment of the invention, orange red of visible light on PDP generated by gas discharging may be prepared by a predetermined mixing ratio of red and green lights. It is possible to add the orange red of visible light component generated by red discharge cell and the orange red of visible light component generated by green discharge cell through a numeric operation to obtain a complete orange red of visible light, i.e., $O_g = \alpha R_p + \beta G_p$ (i.e., $\gamma=0$). It is also possible to adjust strength of input image signals of red and green discharge cells respectively. Further, brightness terms of $\alpha(a+b+c)R_p$ and $\beta(a+b+c)G_p$ (i.e. the above compensation functions) are subtracted from the light generated by red discharge cell and green discharge cell respectively. The ratio of generated red and green may be adjusted to a suitable one for completely eliminating the adverse effect of orange red of visible light on color purity and color temperature of PDP, resulting in a rendering of an optimum color purity and color temperature.

In a third embodiment of the invention when the discharge conditions of red, green and blue discharge cells are different from one another, the compensation functions may be expressed by $(\alpha_R a + \alpha_G b + \alpha_B c)R_p$, $(\beta_R a + \beta_G b + \beta_B c)G_p$, and $(\gamma_R a + \gamma_G b + \gamma_B c)B_p$ where $\alpha_R$, $\alpha_G$, $\alpha_B$, $\beta_R$, $\beta_G$, $\beta_B$, $\gamma_R$, $\gamma_G$ and $\gamma_B$ are constants or variables depending on the gas discharging conditions.

In brief, the compensation process of the invention for improving color purity and color temperature of PDP comprises the step of increasing or decreasing the strength of input image signals of each of red, green, and blue discharge cells for adjusting the brightness of generated red, green, and blue lights so as to subtract orange red of visible light generated by each of the red, green, and blue discharge cells during gas discharging. This can completely eliminate the adverse effect of orange red of visible light on color purity and color temperature of PDP. Most importantly, there is no need to modify the construction of PDP or perform an additional processing thereon. This is simple, resulting in a reduction in the manufacturing cost. When the constituent components of mixed gas are changed, resulting in a generation of visible light having a color other than above, the compensation process of the invention is still applicable.

While the invention has been described by means of specific embodiments, numerous modifications and variations could be made thereto by those skilled in the art without departing from the scope and spirit of the invention set forth in the claims.

What is claimed is:

1. A compensation method for improving color purity and color temperature of a plasma display panel by adjusting the strength of input image signals, comprising the steps of:

finding a brightness of a pixel, wherein said pixel is a combination of a red discharge cell, a green discharge cell, and a blue discharge cell, and wherein said brightness is a summation of a first brightness of said red discharge cell, a second brightness of said green discharge cell, and a third brightness of said blue discharge cell;

expressing said brightness of said pixel as a summation of a first factor multiplied by a first brightness of a phosphor layer of said red discharge cell, a second factor multiplied by a second brightness of a phosphor layer of said green discharge cell, a third factor multiplied by a third brightness of a phosphor layer of said blue discharge cell, and an extra factor multiplied by an extra brightness of an orange red visible light generated during a gas discharging process, wherein said extra factor is a summation of said first factor, said second factor, and said third factor, and wherein said extra brightness is expressed as a fourth factor multiplied by said first brightness plus a fifth factor multiplied by said second brightness, plus a sixth factor multiplied by said third brightness; and adjusting said brightness of said pixel by subtracting a first term from said first brightness, subtracting a second term from said second brightness, and subtracting a third term from said third brightness, wherein said first term is a product of said fourth factor, said first brightness, and a common term, wherein said second term is a product of said fifth factor, said second brightness, and said common term, and wherein said third term is a product of said sixth factor, said third brightness, and said common term, and wherein said common term is a summation of said first factor, said second factor, and said third factor.

2. The compensation method of claim 1, wherein said first factor is a gray scale level of a red light emitted by said red discharge cell, said second factor is a gray scale level of a green light emitted by said green discharge cell, and said third factor is a gray scale level of a blue light emitted by said blue discharge cell.

3. The compensation method of claim 1, wherein said first brightness is generated by a unit gray scale of a phosphor layer in said red discharge cell, said second brightness is generated by a unit gray scale of a phosphor layer in said green discharge cell, and said third brightness is generated by a unit gray scale of a phosphor layer in said blue discharge cell.

4. The compensation method of claim 1, wherein said extra brightness is generated by a unit gray scale during a gas discharging process.

5. The compensation method of claim 1, wherein said fourth factor is chosen from a group consisting of constants and variables.

6. The compensation method of claim 1, wherein said fifth factor is chosen from a group consisting of constants and variables.

7. The compensation method of claim 1, wherein said sixth factor is chosen from a group consisting of constants and variables.

8. The compensation method of claim 1, wherein the product of said common factor and said extra brightness is the adverse effect of generated orange red visible light.

9. The compensation method of claim 1, wherein said fourth factor is a summation of a seventh factor multiplied by a said first factor plus an eighth factor multiplied by said second factor plus a ninth factor multiplied by said third factor, said fifth factor is a summation of a tenth factor multiplied by said first factor plus an eleventh factor multiplied by said second factor plus a twelfth factor multiplied by said third factor, and said sixth factor is a summation of a thirteenth factor multiplied by said first factor plus a fourteenth factor multiplied by said second factor plus a fifteenth factor multiplied by said third factor.

10. The compensation method of claim 9, wherein said seventh factor, said eighth factor, said ninth factor, said tenth factor, said eleventh factor, said twelfth factor, said thirteenth factor, said fourteenth factor, and said fifteenth factor are each selected from a group consisting of constants and variables.

11. A compensation method for improving color purity and color temperature of a plasma display panel by adjusting the strength of input image signals, comprising:

finding a brightness of a pixel, wherein said pixel is a combination of a first discharge cell and a second discharge cell, and wherein said brightness is a summation of a first brightness of said first discharge cell and a second brightness of said second discharge cell;

expressing said brightness of said pixel as a summation of a first factor multiplied by a first brightness of a phosphor layer of said first discharge cell, a second factor multiplied by a second brightness of a phosphor layer of said second discharge cell, and an extra factor multiplied by an extra brightness of an orange red visible light generated during a gas discharging process, wherein said extra factor is a summation of said first factor and said second factor, and wherein said extra brightness is expressed as a third factor multiplied by said first brightness plus a fourth factor multiplied by said second brightness; and adjusting said brightness of said pixel by subtracting a first term from said first brightness and subtracting a second term from said second brightness, wherein said first term is a product of said third factor, said first brightness, and a common term, wherein said second term is a product of said fourth factor, said second brightness, and a common term, and wherein said common term is a summation of said first factor and said second factor.

12. The compensation method of claim 11, wherein said first discharge cell is a red discharge cell and said second discharge cell is a green discharge cell.

13. The compensation method of claim 11, wherein said first discharge cell is a red discharge cell and said second discharge cell is a line discharge cell.

14. The compensation method of claim 11, wherein said first discharge cell is a blue discharge cell and said second discharge cell is a green discharge cell.

15. The compensation method of claim 11, wherein said first factor is a gray scale level of a red light emitted by said red discharge cell, and said second factor is a gray scale level of a green light emitted by said green discharge cell.

16. The compensation method of claim 11, wherein said first brightness is generated by a unit gray scale of a phosphor layer in said red discharge cell, and said second brightness is generated by a unit gray scale of a phosphor layer in said green discharge cell.

17. The compensation method of claim 11, wherein said extra brightness is generated by a unit gray scale during a gas discharging process.

18. The compensation method of claim 11, wherein said third factor is chosen from a group consisting of constants and variables.

19. The compensation method of claim 11, wherein said fourth factor is chosen from a group consisting of constants and variables.

20. The compensation method of claim 11, wherein the product of said common factor and said extra brightness is the adverse effect of generated orange red visible light.

* * * * *